US011086738B2

(12) United States Patent
Patel et al.

(10) Patent No.: US 11,086,738 B2
(45) Date of Patent: Aug. 10, 2021

(54) SYSTEM AND METHOD TO AUTOMATE SOLUTION LEVEL CONTEXTUAL SUPPORT

(71) Applicant: EMC IP Holding Company LLC, Hopkinton, MA (US)

(72) Inventors: Dharmesh M. Patel, Round Rock, TX (US); Ravikanth Chaganti, Bangalore (IN); Rizwan Ali, Cedar Park, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 117 days.

(21) Appl. No.: 15/961,237

(22) Filed: Apr. 24, 2018

(65) Prior Publication Data
US 2019/0324873 A1    Oct. 24, 2019

(51) Int. Cl.
G06F 11/00      (2006.01)
G06F 11/20      (2006.01)
G06F 11/34      (2006.01)
G06F 11/30      (2006.01)

(52) U.S. Cl.
CPC ...... *G06F 11/2023* (2013.01); *G06F 11/3006* (2013.01); *G06F 11/3495* (2013.01); *G06F 2201/82* (2013.01)

(58) Field of Classification Search
CPC ...... G06F 16/21; G06F 16/213; G06F 16/212; G06F 16/28; G06F 11/2023; G06F 11/2033; G06F 11/2028; G06F 11/2025; G06F 11/2252; G06F 11/2257; G06F 11/3006; G06F 11/3495; G06Q 10/087; G06Q 10/0875; G06Q 10/20
See application file for complete search history.

(56) References Cited

U.S. PATENT DOCUMENTS

| 5,483,637 A * | 1/1996 | Winokur ............ H04L 43/00 714/26 |
| 5,867,714 A | 2/1999 | Todd et al. |
| 6,012,152 A | 1/2000 | Douik et al. |
| 6,205,409 B1 * | 3/2001 | Zvonar ............ G01F 25/00 137/486 |

(Continued)

OTHER PUBLICATIONS

Liang, "ClusterProbe: An Open, Flexible and Scalable Cluster Monitoring Tool", 1999, IEEE Computer Society International Workshop on Cluster Computing, pp. 1-8 (Year: 1999).*

(Continued)

*Primary Examiner* — Marc Duncan
(74) *Attorney, Agent, or Firm* — Chamberlain, Hrdlicka, White, Williams & Aughtry

(57) ABSTRACT

A support engine for managing computing clusters includes a persistent storage and a processor. The persistent storage includes monitoring policies. The processor monitors a computing cluster of the computing clusters and identifies a potential component failure of the computing cluster based on the monitoring and the monitoring policies. In response to identifying the potential component failure the processor identifies an error state of the computing cluster; obtains solution level state information from the computing cluster based on the identified error state; generates a support package comprising the solution level state information; and initiates a support session by sending the generated support package to a support manager.

20 Claims, 12 Drawing Sheets

(56) References Cited

U.S. PATENT DOCUMENTS

| | | | |
|---|---|---|---|
| 6,317,028 B1 | 11/2001 | Valiulis | |
| 6,473,794 B1 * | 10/2002 | Guheen | H04L 41/22 709/223 |
| 6,606,744 B1 * | 8/2003 | Mikurak | H04L 29/06 717/174 |
| 6,633,782 B1 | 10/2003 | Schleiss et al. | |
| 6,742,141 B1 * | 5/2004 | Miller | G06F 11/0748 706/45 |
| 6,795,935 B1 | 9/2004 | Unkle et al. | |
| 6,871,224 B1 * | 3/2005 | Chu | H04L 29/06 709/223 |
| 7,103,874 B2 | 9/2006 | McCollum et al. | |
| 7,222,127 B1 | 5/2007 | Bem et al. | |
| 7,334,222 B2 | 2/2008 | Keller | |
| 7,370,102 B1 * | 5/2008 | Chu | G06F 11/0709 709/223 |
| 7,490,073 B1 | 2/2009 | Qureshi et al. | |
| 7,500,142 B1 * | 3/2009 | Cowart | H04L 41/065 702/183 |
| 7,516,362 B2 | 4/2009 | Connelly et al. | |
| 7,536,595 B1 | 5/2009 | Hiltunen et al. | |
| 7,757,124 B1 | 7/2010 | Singh et al. | |
| 7,827,136 B1 | 11/2010 | Wang | |
| 7,831,693 B2 | 11/2010 | Lai | |
| 7,886,031 B1 | 2/2011 | Taylor et al. | |
| 7,987,353 B2 | 7/2011 | Holdaway et al. | |
| 8,001,527 B1 | 8/2011 | Qureshi et al. | |
| 8,166,552 B2 | 4/2012 | Prafullchandra et al. | |
| 8,290,970 B2 | 10/2012 | Hohmann | |
| 8,386,930 B2 | 2/2013 | Dillenberger et al. | |
| 8,401,982 B1 | 3/2013 | Satish et al. | |
| 8,583,769 B1 | 11/2013 | Peters et al. | |
| 8,639,798 B1 | 1/2014 | Akiyama et al. | |
| 8,774,054 B2 | 7/2014 | Yin et al. | |
| 8,826,077 B2 | 9/2014 | Bobak et al. | |
| 8,868,987 B2 | 10/2014 | Wagner | |
| 8,874,892 B1 | 10/2014 | Chan et al. | |
| 8,938,621 B2 | 1/2015 | Mao et al. | |
| 8,973,118 B2 | 3/2015 | Fitzpatrick, III | |
| 8,995,439 B2 | 3/2015 | Field | |
| 9,122,501 B1 | 9/2015 | Hsu et al. | |
| 9,122,739 B1 * | 9/2015 | Yadwadkar | G06F 16/28 |
| 9,201,751 B1 | 12/2015 | Muthirisavenugopal et al. | |
| 9,225,625 B1 | 12/2015 | He et al. | |
| 9,229,902 B1 | 1/2016 | Leis et al. | |
| 9,278,481 B2 | 3/2016 | Hull | |
| 9,323,789 B1 | 4/2016 | Elliott | |
| 9,355,036 B2 | 5/2016 | Beard et al. | |
| 9,384,082 B1 * | 7/2016 | Lee | G06F 11/3034 |
| 9,542,177 B1 | 1/2017 | Johansson et al. | |
| 9,590,849 B2 * | 3/2017 | Shakirzyanov | G06F 9/5061 |
| 9,594,620 B2 * | 3/2017 | Xia | G06F 11/0787 |
| 9,729,615 B2 | 8/2017 | Nair | |
| 9,864,634 B2 | 1/2018 | Kenkre et al. | |
| 9,898,224 B1 | 2/2018 | Marshak et al. | |
| 9,999,030 B2 | 6/2018 | Gu et al. | |
| 10,048,996 B1 | 8/2018 | Bell et al. | |
| 10,057,184 B1 | 8/2018 | Prahlad et al. | |
| 10,097,620 B2 | 10/2018 | Reddy et al. | |
| 10,514,907 B2 | 12/2019 | Chaganti et al. | |
| 10,944,561 B1 | 3/2021 | Cahill et al. | |
| 2003/0149919 A1 * | 8/2003 | Greenwald | G06F 11/2257 714/43 |
| 2004/0078683 A1 | 4/2004 | Buia et al. | |
| 2004/0088145 A1 | 5/2004 | Rosenthal | |
| 2004/0177168 A1 | 9/2004 | Alabraba et al. | |
| 2004/0177354 A1 | 9/2004 | Gunyakti et al. | |
| 2004/0225381 A1 * | 11/2004 | Ritz | G06F 11/0709 700/26 |
| 2004/0250260 A1 | 12/2004 | Pioso | |
| 2005/0033770 A1 * | 2/2005 | Oglesby | G09B 19/00 |
| 2005/0078656 A1 | 4/2005 | Bryant et al. | |
| 2005/0120112 A1 * | 6/2005 | Wing | G06Q 10/06 709/224 |
| 2005/0144151 A1 | 6/2005 | Fischman et al. | |
| 2005/0144188 A1 | 6/2005 | Bailey et al. | |
| 2006/0117212 A1 * | 6/2006 | Meyer | H04L 49/357 714/4.11 |
| 2006/0149408 A1 * | 7/2006 | Speeter | G06F 8/71 700/126 |
| 2006/0178864 A1 | 8/2006 | Khanijo | |
| 2006/0179116 A1 | 8/2006 | Speeter et al. | |
| 2006/0235962 A1 * | 10/2006 | Vinberg | H04L 41/0631 709/224 |
| 2007/0143851 A1 * | 6/2007 | Nicodemus | G06F 11/3495 726/25 |
| 2007/0202469 A1 * | 8/2007 | Davidson | G09B 25/00 434/29 |
| 2007/0283011 A1 | 12/2007 | Rakowski et al. | |
| 2008/0037532 A1 | 2/2008 | Sykes et al. | |
| 2008/0065700 A1 | 3/2008 | Lim | |
| 2008/0201470 A1 * | 8/2008 | Sayama | G06F 11/0709 709/224 |
| 2008/0228755 A1 | 9/2008 | Haga et al. | |
| 2008/0262860 A1 | 10/2008 | Schneider et al. | |
| 2009/0012805 A1 | 1/2009 | Schnell et al. | |
| 2009/0113248 A1 | 4/2009 | Bock et al. | |
| 2009/0165099 A1 | 6/2009 | Eldar et al. | |
| 2009/0183010 A1 | 7/2009 | Schnell et al. | |
| 2009/0260071 A1 | 10/2009 | Sadovsky et al. | |
| 2009/0282283 A1 * | 11/2009 | Sakakura | G06F 11/2033 714/4.1 |
| 2009/0307333 A1 | 12/2009 | Welingkar | |
| 2010/0024001 A1 | 1/2010 | Campbell | |
| 2010/0057677 A1 | 3/2010 | Rapp et al. | |
| 2010/0180221 A1 | 7/2010 | Cloward et al. | |
| 2010/0229022 A1 * | 9/2010 | Anand | G06F 11/079 714/2 |
| 2010/0306489 A1 * | 12/2010 | Abts | G06F 12/1483 711/163 |
| 2010/0312522 A1 | 12/2010 | Laberge et al. | |
| 2010/0318487 A1 | 12/2010 | Marvasti | |
| 2010/0325493 A1 * | 12/2010 | Morimura | G06F 11/0709 714/39 |
| 2011/0078428 A1 | 3/2011 | Hamid | |
| 2011/0093703 A1 | 4/2011 | Etchegoyen | |
| 2011/0270482 A1 | 11/2011 | Holzer | |
| 2011/0289342 A1 * | 11/2011 | Schaefer | G06F 11/1458 714/4.1 |
| 2011/0289343 A1 * | 11/2011 | Schaefer | G06F 11/1458 714/4.1 |
| 2011/0302305 A1 * | 12/2011 | Morimura | G06F 11/0709 709/224 |
| 2012/0041976 A1 | 2/2012 | Annapragada | |
| 2012/0083917 A1 * | 4/2012 | Zhou | G05B 23/0283 700/110 |
| 2012/0096272 A1 | 4/2012 | Jasper et al. | |
| 2012/0110142 A1 | 5/2012 | Montagna et al. | |
| 2012/0144244 A1 | 6/2012 | Dan et al. | |
| 2012/0150926 A1 | 6/2012 | Adkins et al. | |
| 2012/0166142 A1 * | 6/2012 | Maeda | G05B 23/0227 702/185 |
| 2012/0182151 A1 | 7/2012 | Tong | |
| 2012/0233216 A1 * | 9/2012 | Lim | G06F 21/6227 707/781 |
| 2012/0265872 A1 | 10/2012 | Chilton | |
| 2012/0271927 A1 * | 10/2012 | Shakirzyanov | G06F 9/5061 709/220 |
| 2012/0331526 A1 | 12/2012 | Caudle et al. | |
| 2013/0151975 A1 | 6/2013 | Shadi et al. | |
| 2013/0185667 A1 | 7/2013 | Harper et al. | |
| 2013/0257627 A1 * | 10/2013 | Rafael | G05B 19/0426 340/691.6 |
| 2013/0317870 A1 | 11/2013 | Franco et al. | |
| 2013/0326029 A1 * | 12/2013 | Flynn | H04L 41/0803 709/220 |
| 2014/0069291 A1 | 3/2014 | Yang | |
| 2014/0082417 A1 | 3/2014 | Barton et al. | |
| 2014/0115176 A1 * | 4/2014 | Kamboh | H04L 67/142 709/228 |

(56) References Cited

U.S. PATENT DOCUMENTS

| | | | |
|---|---|---|---|
| 2014/0245085 A1* | 8/2014 | Halverson | G06F 11/0745 |
| | | | 714/57 |
| 2014/0281675 A1 | 9/2014 | Sreenivasan et al. | |
| 2014/0304399 A1* | 10/2014 | Chaudhary | H04L 41/5009 |
| | | | 709/224 |
| 2014/0304402 A1* | 10/2014 | Prakash | H04L 43/10 |
| | | | 709/224 |
| 2014/0324276 A1 | 10/2014 | Weaks | |
| 2014/0337957 A1 | 11/2014 | Feekes | |
| 2014/0344101 A1* | 11/2014 | Collet | G06Q 30/0631 |
| | | | 705/26.7 |
| 2015/0117174 A1* | 4/2015 | Alber | G11B 27/36 |
| | | | 369/53.41 |
| 2015/0120359 A1 | 4/2015 | Dongieux | |
| 2015/0149822 A1* | 5/2015 | Coronado | G06F 11/0727 |
| | | | 714/15 |
| 2015/0256394 A1 | 9/2015 | Palmer | |
| 2015/0324255 A1 | 11/2015 | Kochunni | |
| 2016/0042288 A1* | 2/2016 | Cohen | G06F 16/951 |
| | | | 706/11 |
| 2016/0048611 A1 | 2/2016 | Cox | |
| 2016/0050222 A1* | 2/2016 | Iyer | H04L 43/0876 |
| | | | 726/1 |
| 2016/0057009 A1 | 2/2016 | Kadayam et al. | |
| 2016/0110240 A1* | 4/2016 | Reger | G06F 16/285 |
| | | | 714/37 |
| 2016/0112504 A1* | 4/2016 | Mathur | H04L 29/06 |
| | | | 709/224 |
| 2016/0173690 A1 | 6/2016 | Perez et al. | |
| 2016/0294643 A1 | 10/2016 | Kim | |
| 2016/0302323 A1 | 10/2016 | Gosselin | |
| 2017/0017881 A1* | 1/2017 | Langley | G06N 5/04 |
| 2017/0032091 A1 | 2/2017 | Rudorfer et al. | |
| 2017/0085644 A1* | 3/2017 | Chouhan | G06F 3/06 |
| 2017/0094003 A1 | 3/2017 | Gahlot et al. | |
| 2017/0206128 A1 | 7/2017 | Anderson et al. | |
| 2017/0242740 A1* | 8/2017 | Bell | G06F 40/44 |
| 2017/0339005 A1 | 11/2017 | Yuan et al. | |
| 2018/0025166 A1 | 1/2018 | Daniel et al. | |
| 2018/0034709 A1 | 2/2018 | Chen et al. | |
| 2018/0041388 A1 | 2/2018 | Moens et al. | |
| 2018/0285009 A1 | 10/2018 | Guim Bemat et al. | |
| 2018/0302277 A1 | 10/2018 | Shimamura et al. | |
| 2018/0321934 A1 | 11/2018 | Chaganti et al. | |
| 2018/0322019 A1 | 11/2018 | Stowell et al. | |
| 2018/0329579 A1 | 11/2018 | Kaimal et al. | |
| 2019/0123985 A1* | 4/2019 | Rao | H04L 43/062 |
| 2019/0149408 A1 | 5/2019 | Li | |
| 2019/0182105 A1 | 6/2019 | Stephens et al. | |
| 2019/0303137 A1 | 10/2019 | Chaganti et al. | |
| 2019/0306013 A1 | 10/2019 | Ali et al. | |
| 2019/0324841 A1* | 10/2019 | Patel | G06F 11/0793 |
| 2020/0034069 A1* | 1/2020 | Batra | G06F 11/3006 |
| 2020/0079403 A1* | 3/2020 | Setiawan | B61L 15/0081 |

OTHER PUBLICATIONS

"Integrated Dell Remote Access Controller 8 (iDRAC8)", Version 2.05.05.05 User's Guide, Dell Inc., Dec. 2014 (348 pages).

Iler, Doug, et al., "Introducing iDRAC8 with Lifecycle Controller for Dell 13th Generation PowerEdge Servers", A Dell Deployment and Configuration Guide, Dell Inc., Sep. 2014 (16 pages).

"Dell DRAC—Wikipedia"; XP055602141; Mar. 23, 2018; https://en.wikipedia.org/w/index.php?title=Dell_DRAC&oldid=831957421.

"Dell EMC OpenManage Essentials Version 2.3: User's Guide"; XP055602720; Oct. 1, 2017; https://topics-cdn.dell.com/pdf/openmanage-essentials-v23 users-guide en-us.pdf.

Duncan Tweed; "BMC Atrium Discovery User Guide"; BMC Software, Inc.; Mar. 2014; retrieved from https://bmc.com/.

Duncan Tweed; "Baseline configuration"; BMC Software, Inc.; Apr. 7, 2015; retrieved from https://bmc.com/.

Masoom Parvez; "AutomaticGroup Node"; BMC Software, Inc.; 2014; retrieved from https://bmc.com/.

George Coulouris et al, Dell EMC Data Protection Advisor: Distributed Systems Concepts and Design, Dell EMC Data Protection Advisor: Distributed Systems Concepts and Design, retrieved Nov. 29, 2020, pp. 1-25 (of 488) https://web.archive.org/web/20201129060023/https://www.delltechnologies.com/en-us/collaterals/unauth/technical-guides-support-inforrnation/products/networking-4/docu82478.pdf, Report Reference Guide 302-003-605 Rev 1 (2017) 27 pages.

Extended European Search Report issued in corresponding European Application No. 19151952.9, dated Jul. 1, 2019.

Extended European Search Report issued in corresponding European Application No. 18200661.9 dated Apr. 1, 2019. (9 pages).

Coulouris et al.; "Distributed Systems: Concepts and Design, Fifth Edition"; Addison-Wesley; pp. 37-61; 2012 (27 pages).

* cited by examiner

Example Actions 520

| Obtain Hardware State of Component Host 522 | Obtain Software State of Component Host 522 | Obtain Host Settings 524 |
|---|---|---|
| Validate Component 526 | Initiate New Support Session 528 | Generate Log 530 |

FIG. 5B

SYSTEM AND METHOD TO AUTOMATE SOLUTION LEVEL CONTEXTUAL SUPPORT

BACKGROUND

Computing devices may include any number of internal components such as processors, memory, and persistent storage. Each of the internal components may operate with other components of the computing devices. For example, some processors store generated data in a persistent storage and may utilize capacity of the memory to perform computations.

In a network environment, multiple computing devices may cooperate to accomplish a task. For example, multiple computing devices may perform different computations that may be used, in turn, to generate a final result.

SUMMARY

In one aspect, a support engine for managing computing clusters in accordance with one or more embodiments of the invention includes a persistent storage and a processor. The persistent storage includes monitoring policies. The processor monitors a computing cluster of the computing clusters and identifies a potential component failure of the computing cluster based on the monitoring and the monitoring policies. In response to identifying the potential component failure the processor identifies an error state of the computing cluster; obtains solution level state information from the computing cluster based on the identified error state; generates a support package comprising the solution level state information; and initiates a support session by sending the generated support package to a support manager.

In one aspect, a method for managing computing clusters in accordance with one or more embodiments of the invention includes monitoring a computing cluster of the computing clusters and identifying a potential component failure of the computing cluster based on the monitoring and monitoring policies. The method further includes, in response to identifying the potential component failure, identifying an error state of the of the computing cluster; obtaining solution level state information from the computing cluster based on the identified error state; generating a support package comprising the solution level state information; and initiating a support session by sending the generated support package to a support manager to correct the potential component failure.

In one aspect, a non-transitory computer readable medium in accordance with one or more embodiments of the invention includes computer readable program code, which when executed by a computer processor enables the computer processor to perform a method for managing computing clusters, the method includes monitoring a computing cluster of the computing clusters and identifying a potential component failure of the computing cluster based on the monitoring and monitoring policies. The method further includes, in response to identifying the potential component failure, identifying an error state of the of the computing cluster; obtaining solution level state information from the computing cluster based on the identified error state; generating a support package comprising the solution level state information; and initiating a support session by sending the generated support package to a support manager to correct the potential component failure.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 5B shows a diagram of example actions of monitoring policies in accordance with one or more embodiments of the invention.

DETAILED DESCRIPTION

Figure 1:
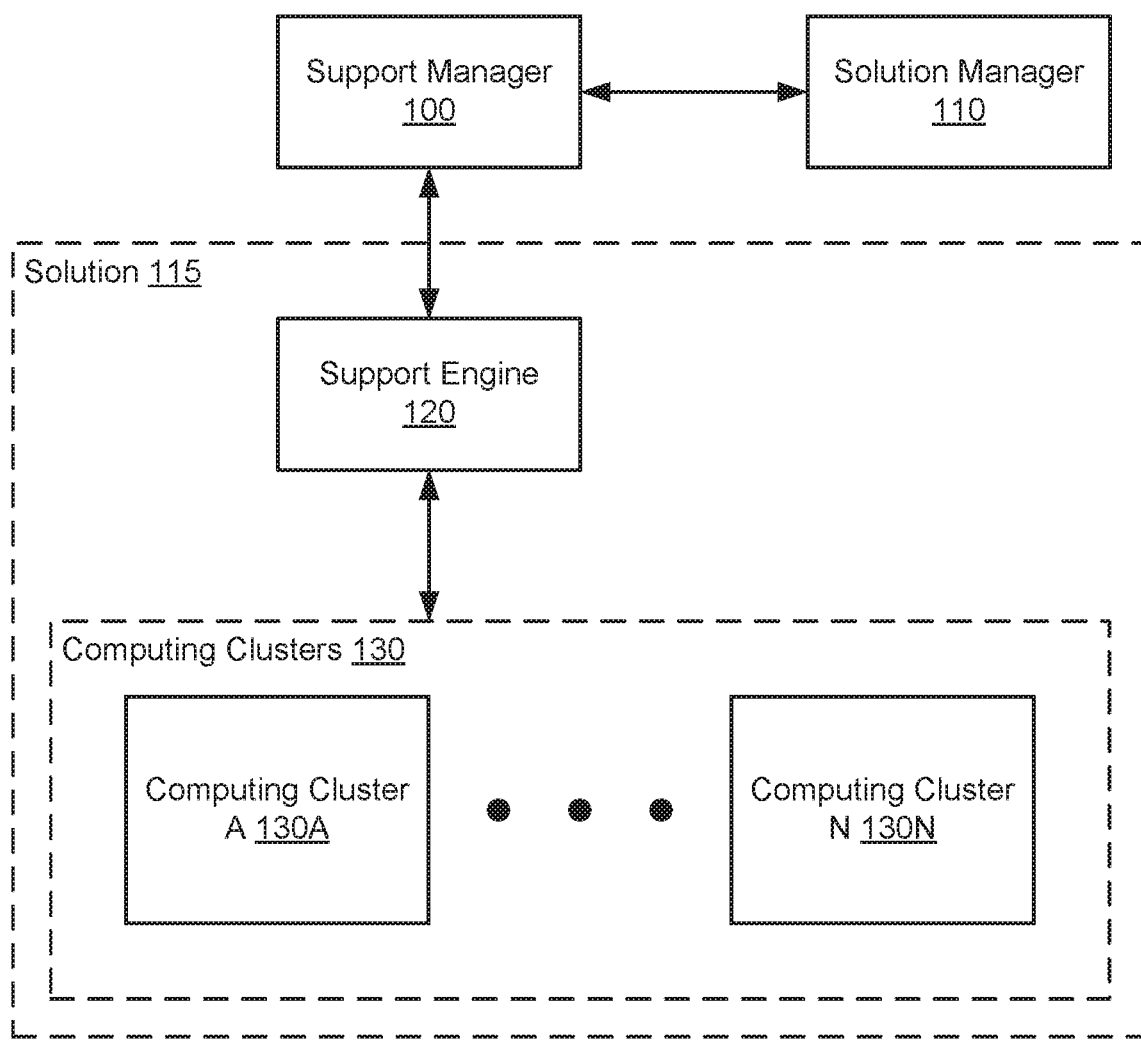
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing a solution. A solution may include one or more computing clusters. Each of the computing clusters may include computing devices.

Each of the computing devices may include individual components. The solution may orchestrate the computing devices to perform predetermined actions to accomplish a goal.

Due to the complexity of a solution, the failure of any component of the solution may impact the performance of any portion of the solution. For example, failure of a data storage device of a computing device may manifest itself as a decrease in the transaction rate of a database application hosted by a second computing device.

In one or more embodiments of the invention, a system includes a support engine that monitors the components of a solution. The support engine may detect potential component failures based upon the decrease in performance of a portion of the solution. The detected potential component failures may be real or may be the manifestations of failures of other components.

In response to the detection of a potential component failure, the support engine may automatically obtain solution level state information. The solution level state information may include various performance metrics regarding the overall functionality of the solution. The solution level state information may be used to determine a corrective action to be performed. In this manner, embodiments of the invention may quickly and automatically obtain all of the information that may be necessary to identify a component that has truly failed. Doing so reduces the amount of time required to identify a corrective action that actually remediates the failure of the component in the solution.

FIG. 1 shows a system in accordance with one or more embodiments of the invention. The system may include a support manager (100) that manages a solution (115) by diagnosing problems with the supported solution (115) and performing corrective actions. The system may include a support engine (120) that obtains information regarding the state of computing clusters (130). The support engine (120) may provide the obtained information to the support manager (100) to enable it to perform its management functions. In the case of a hardware problem, rather than a software problem, the support manager (100) may identify replacement hardware via a solution manager (110). Each of the aforementioned components may be operably connected by any combination of wired and wireless networks. Each components is discussed below.

In one or more embodiments of the invention, the support manager (100) diagnoses and remediates problems of the computing clusters (130) that may otherwise disrupt the functionality of the computing clusters (130). For example, computing cluster A (130A) may report a decrease in the ability of one computing devices of the cluster to communicate with other computing devices of the cluster. In such a scenario, the support manager (100) may identify a problem with computing cluster A (130A), identify a solution, and initiate corrective actions in computing cluster A (130A) to address the identified problem.

To provide the aforementioned functionality, the support manager (100) may obtain state information of the computing clusters (130) from the support engine (120), or another entity. Similarly, when a hardware problem with a computing cluster is identified, the support manager (100) may identify a replacement component via the solution manager (110). For additional details regarding the support manager (100), See FIG. 2.

In one or more embodiments of the invention, the support manager (100) is a computing device. The computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the support manager (100) described in this application and/or perform all or portion of the methods illustrated in FIGS. 6-8. For additional details regarding a computing device, See FIG. 10.

In one or more embodiments of the invention, the support manager (100) is a logical device. A logical device may be a virtual device that utilizes the computing resources of any number of computing devices to perform its functions. The logical device may be implemented as computer instructions, e.g., computer code, that when executed by the processor(s) of one or more computing devices cause the computing devices to perform the functions of the support manager (100) described in this application and/or all or portion of the methods illustrated in FIGS. 6-8.

In one or more embodiments of the invention, the solution manager (110) identifies replacement hardware for components of the computing clusters (130). Due to underlying hardware or software requirements, each of the components may only be compatible with specific hardware components. Further, due to finite limitations, not all types of hardware may be available at all points in time. The solution manager (110) may identify replacement hardware for a computing cluster by identifying hardware that is both compatible with the computing cluster and available for deployment. For additional details regarding the solution manager, See FIG. 3.

In one or more embodiments of the invention, the solution manager (110) is a computing device. The computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the solution manager (110) described in this application and/or perform all or portion of the methods illustrated in FIGS. 6-8. For additional details regarding a computing device, See FIG. 10.

In one or more embodiments of the invention, the solution manager (110) is a logical device. A logical device may be a virtual device that utilizes the computing resources of any number of computing devices to perform its functions. The logical device may be implemented as computer instructions, e.g., computer code, that when executed by the processor(s) of one or more computing devices cause the computing devices to perform the functions of the solution manager (110) described in this application and/or perform all or portion of the methods illustrated in FIGS. 6-8.

In one or more embodiments of the invention, the support engine (120) monitors the computing clusters (130). Based on the monitoring, the support engine (120) identifies an error state of the computing clusters (130). The support engine (120) may perform monitoring based on instructions or configurations received from the support manager (100). For example, the support manager (100) may provide thresholds that when exceeded trigger the support engine (120) to obtain detailed state information from the computing clusters (130). The support engine (120) may provide the obtained information to the support manager (100). For additional details regarding the support engine, See FIG. 4.

In one or more embodiments of the invention, the support engine (120) is a computing device. The computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the support engine (120) described in this application and/or perform all or portion of the methods illustrated in FIGS. 6-8. For additional details regarding a computing device, See FIG. 10.

In one or more embodiments of the invention, the support engine (120) is a logical device. A logical device may be a virtual device that utilizes the computing resources of any number of computing devices to perform its functions. The logical device may be implemented as computer instructions, e.g., computer code, that when executed by the processor(s) of one or more computing devices cause the computing devices to perform the functions of the support engine (120) described in this application and/or perform all or portion of the methods illustrated in FIGS. 6-8.

In one or more embodiments of the invention, the computing clusters (130A, 130N) are physical devices that perform computations. Each of the computing clusters may operate independently to perform different functions or may be orchestrated to cooperatively perform a predetermined function. In such a scenario, each of the computing clusters may perform similar or different functions cooperatively to accomplish a shared goal.

For example, a first computing cluster may provide computing functionality while a second computing cluster may provide storage functionality. Any number of computing clusters may perform similar or different functions without departing from the invention.

In one or more embodiments of the invention, each computing cluster includes a number of computing devices. Each computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the computing clusters (130A, 130N) described in this application. For additional details regarding a computing device, See FIG. 10.

Figure 2:
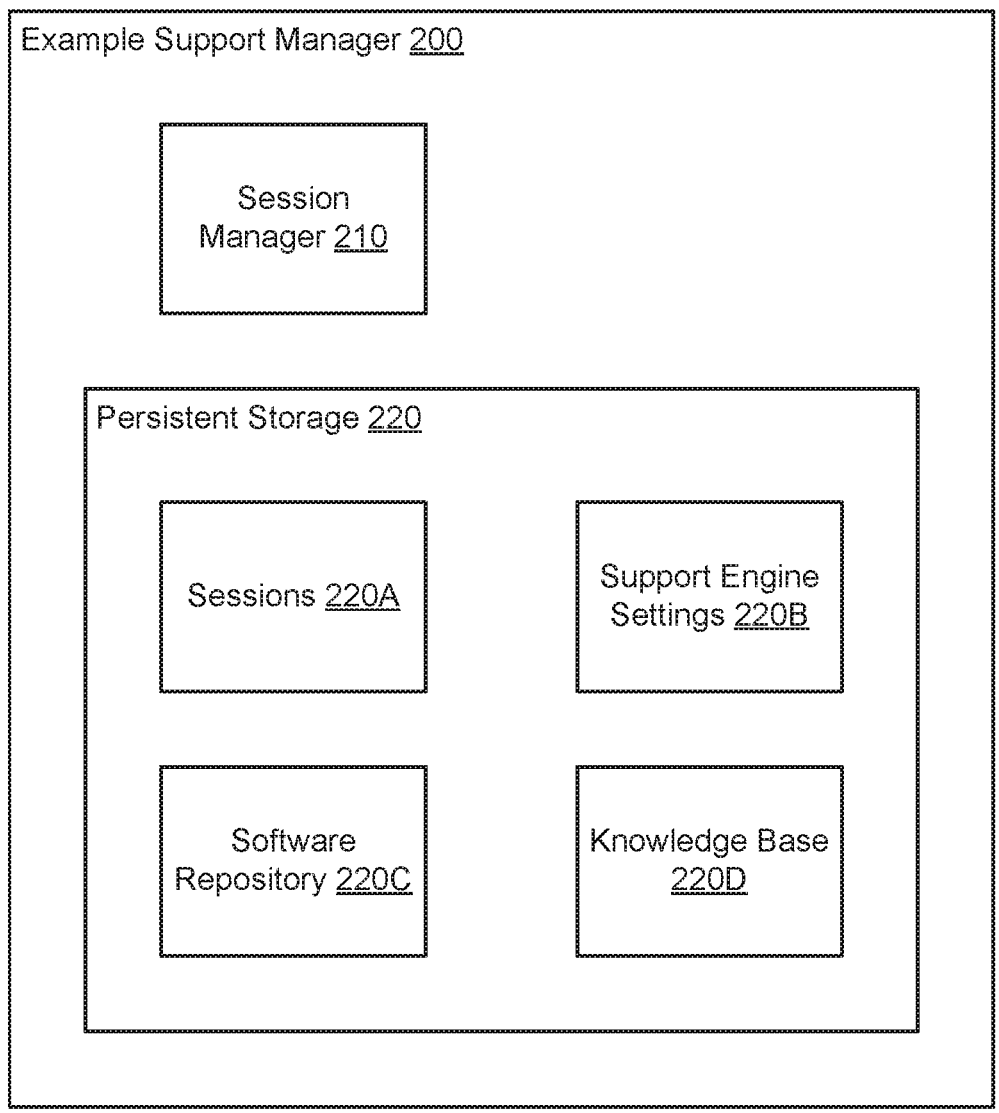
FIG. 2 shows a diagram of an example support manager in accordance with one or more embodiments of the invention.

As discussed above, the support manager (100) may manage the computing clusters (130). FIG. 2 shows a diagram of an example support manager (200) in accordance with one or more embodiments of the invention.

In one or more embodiments of the invention, the example support manager (200) may: (i) monitor the computing clusters, (ii) identify potential component failures, (iii) obtain solution level state information in response to identifying potential component failures, and (iv) initiate the performance of corrective actions to reduce the likelihood that the identified potential component failures will impact the functionality of the computing clusters. To provide the aforementioned functionality, the example support manager (200) may include a session manager (210) and a persistent storage (220). Each component of the example support manager (200) is discussed below.

In one or more embodiments of the invention, the session manager (210) configures support engines to monitor computing clusters, obtains alerts from the support engines when a cluster is identified as having a potential component failure, obtains solution level state information in response to an identified potential component failure, and initiates performance of a corrective action. The corrective action may be a solution level corrective action, i.e., based on solution level state information, rather than a component level corrective action, i.e., based on component level state information.

When an alert from a support engine is obtained, the session manager (210) may initiate a support session with the support engine. The support session may be associated with computing cluster, e.g., a triggering computing cluster, that exceeded a threshold or other trigger criteria. When a support session is initiated, the session may be placed in a queue for analysis by the system. After being placed in the queue, the session manager (210) may obtain solution level state information from the triggering computing cluster.

In one or more embodiments of the invention, the solution level state information may include a solution type of the computing cluster, e.g., a predetermine function of the computing cluster. The solution level state information may include a hardware state of the computing device hosting, i.e., host computing device, the component that triggered the potential component failure. The hardware state may be a listing of the physical component of the aforementioned computing device. The solution level state information may include the hardware state of other computing devices of the triggering cluster that are operably connected to the host computing device. The solution level state information may include a software state of the host computing device, e.g., a listing of the applications, firmware, and associated settings for the applications and firmware of the host computing device. The solution level state information may include the software state of other computing devices of the triggering cluster that are operably connected to the host computing device. The solution level state information may include a transaction log of the host computing device, e.g., a listing of the actions performed over a predetermined period of time. The solution level state information may include transaction logs of other computing devices of the triggering cluster that are operably connected to the host computing device.

In some scenarios, the session manager (210) may determine that a solution level corrective action involves replacing of a physical component of a computing cluster. In such a scenario, the session manager (210) may send a request to a solution manager to identify replacement hardware. The request may specify the component to be replaced. The solution manager may respond by providing an identify of a replacement hardware that is available to facilitate the replacement of the component.

In one or more embodiments of the invention, the session manager (210) is a hardware device including circuitry. The session manager (210) may be, for example, digital signal processor, a field programmable gate array, or an application specific integrated circuit. The session manager (210) may be other types of hardware devices without departing from the invention.

In one or more embodiments of the invention, the session manager (210) is implemented as computing code stored on a persistent storage that when executed by a processor performs the functionality of the session manager (210). The processor may be hardware processor including circuitry such as, for example, a central processing unit or a microcontroller. The processor may be other types of hardware devices for processing digital information without departing from the invention.

Figure 6:
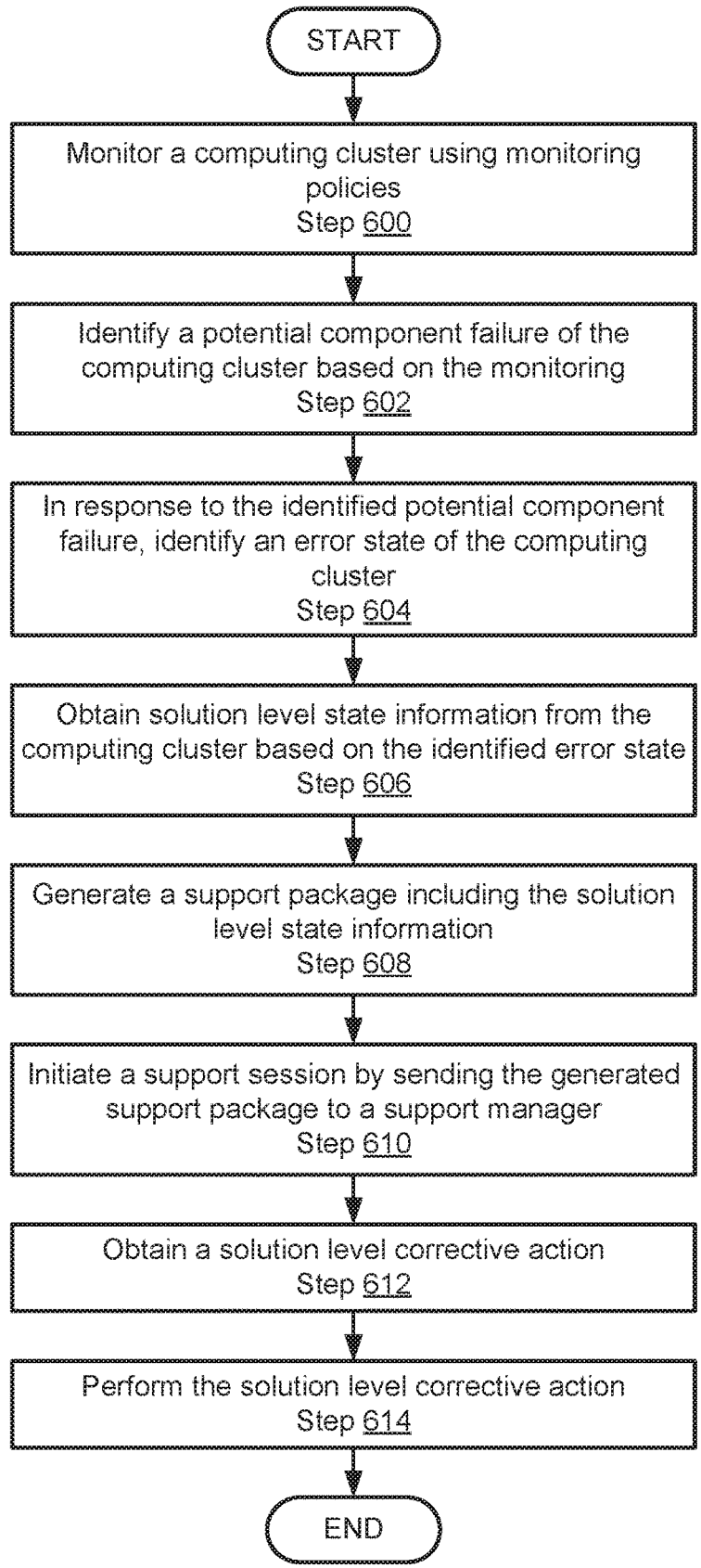
FIG. 6 shows a diagram of a flowchart of a method of correcting a solution in accordance with one or more embodiments of the invention.
Figure 7:
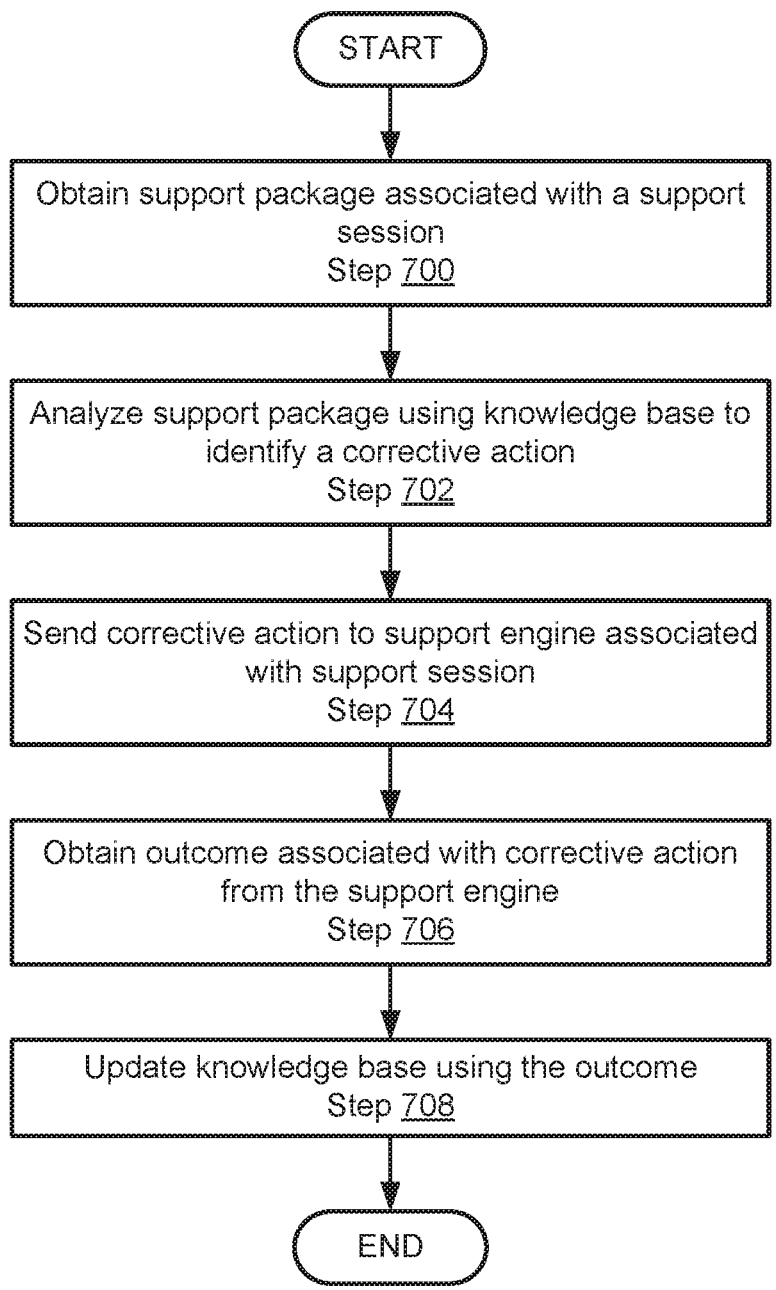
FIG. 7 shows a diagram of a flowchart of a method of managing computing clusters of a solution in accordance with one or more embodiments of the invention.
Figure 8:
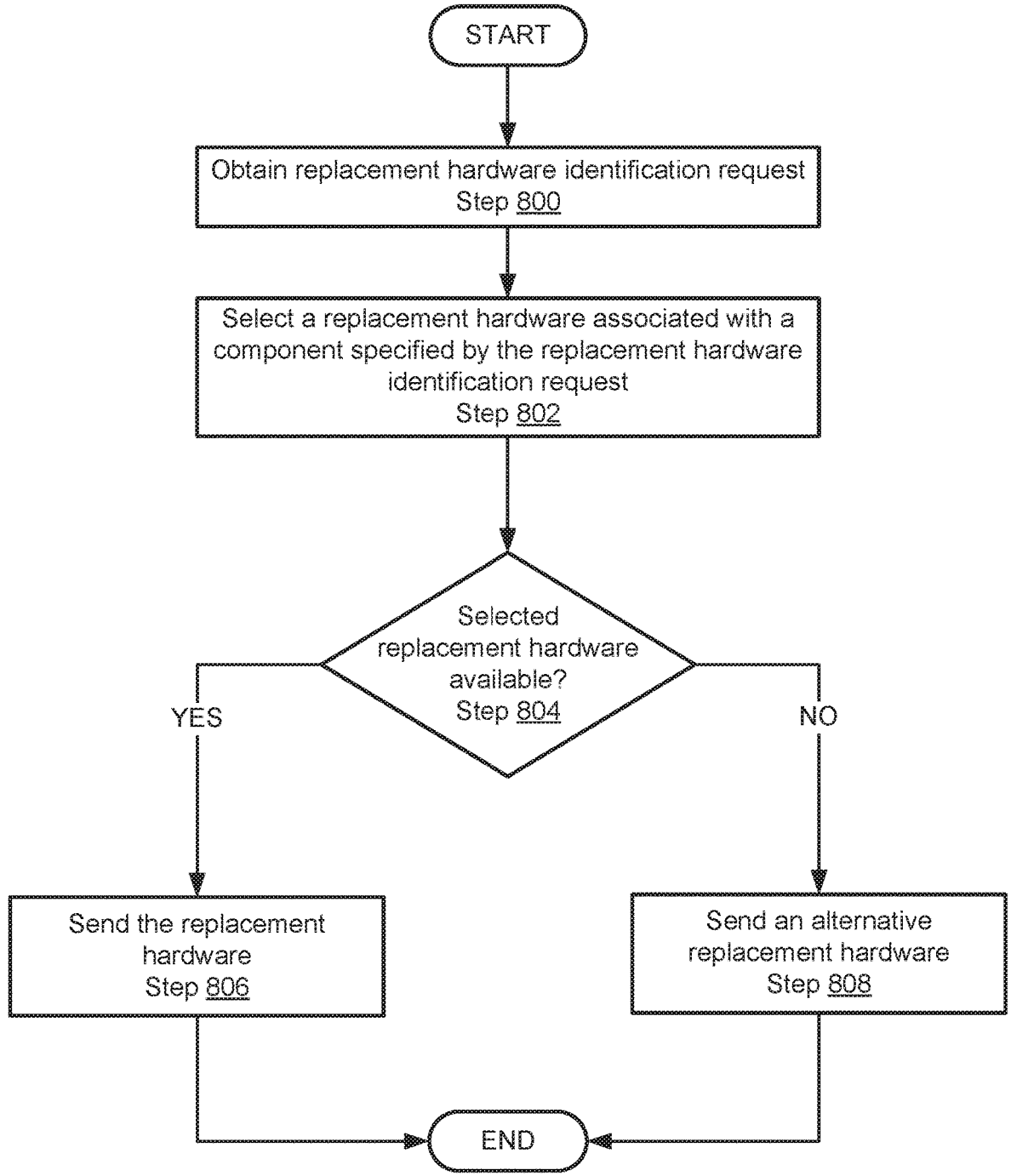
FIG. 8 shows a diagram of a flowchart of a method of selecting replacement components in accordance with one or more embodiments of the invention.

To provide the aforementioned functionality, the session manager (210) may perform all or a portion of the methods illustrated in FIGS. 6-8. When performing the aforementioned methods or other functionality, the session manager (210) may utilize data structures stored in the persistent storage (220).

In one or more embodiments of the invention, the persistent storage (220) is a storage device that stores data structures. The persistent storage may be a physical or virtual device. For example, the persistent storage (220) may include solid state drives, solid state drives, tape drives, and other components to provide data storage functionality. Alternatively, the persistent storage (220) may be a virtual device that utilizes the physical computing resources of other components to provide data storage functionality.

In one or more embodiments of the invention, the persistent storage (220) stores sessions (220A), support engine settings (220B), a software repository (220C), and a knowledge base (220D). The persistent storage (220) may store additional data structures without departing from the invention.

The sessions (220A) may be data structures that include information regarding support sessions, the support sessions may be ongoing or previously completed. The sessions (220A) may include information obtained from a support engine used by the session manager (210) to identify a corrective action. For example, the sessions (220A) may include component state information and/or solution state information used by the session manager (210) to identify a solution level corrective action. Each session may be associated with a place in a support queue and a potential component failure that caused the session to be initiated. Each session may be generated by the session manager (210) when a support engine notifies the example support manager (200) that a component of a computing cluster has triggered a potential component failure.

The support engine settings (220B) may be a data structure that includes settings used by the session manager (210) to configure support engines. Specifically, the support engine settings (220B) may be used to configure component policies of the support engines that are used to determined whether a component is potentially in a failure state. For additional details regarding component policies, See FIGS. 5A and 5B.

The software repository (220C) may be a data structure that includes copies of software used by the session manager (210) to initiate the performance of solution level corrective actions. For example, in a scenario in which the session manager (210) makes a determination that a solution level corrective action involves a software replacement, the session manager (210) may obtain a copy of the replacement software and/or software settings and send the copy to a computing device for implementation, i.e., replacing existing software and/or software settings. The software may be applications and/or firmware.

The knowledge base (220D) may be a data structure used by the session manager (210) to identify a solution level corrective action. In other words, the knowledge base (220D) may map component level and/or solution level state information to solution level corrective actions. The mappings may be specified at any of granularity.

The knowledge base (220D) may be generated based on previous sessions. In other words, the contents of the knowledge base (220D) may be generated heuristically. The knowledge base (220D) may be automatically updated by the session manager (210) upon completion of a support session. In other words, the session manager (210) may generate a new mapping between component level and/or solution level state information to a solution level corrective action that resulted in the elimination of the potential component failure, i.e., restored the performance of the computing cluster.

The aforementioned mappings of the knowledge base (220D) are unconventional because the mappings assume that a potential component failure is not necessarily based on the component. Rather, the aforementioned mappings make an assumption that the identification of a potential component failure is merely a symptom of a solution level defect. Thus, the knowledge base (220D) mappings are between a solution state and a corrective action, not necessarily a component state and a corrective action.

While the data structures of the persistent storage (220) are illustrated as separate data structures, the aforementioned data structures may be combined with each other and/or other data without departing from the invention. Additionally, while the aforementioned data structures are illustrated as being stored on the example support manager (200), the data structures may be stored on persistent storage of other devices without departing from the invention.

Figure 3:
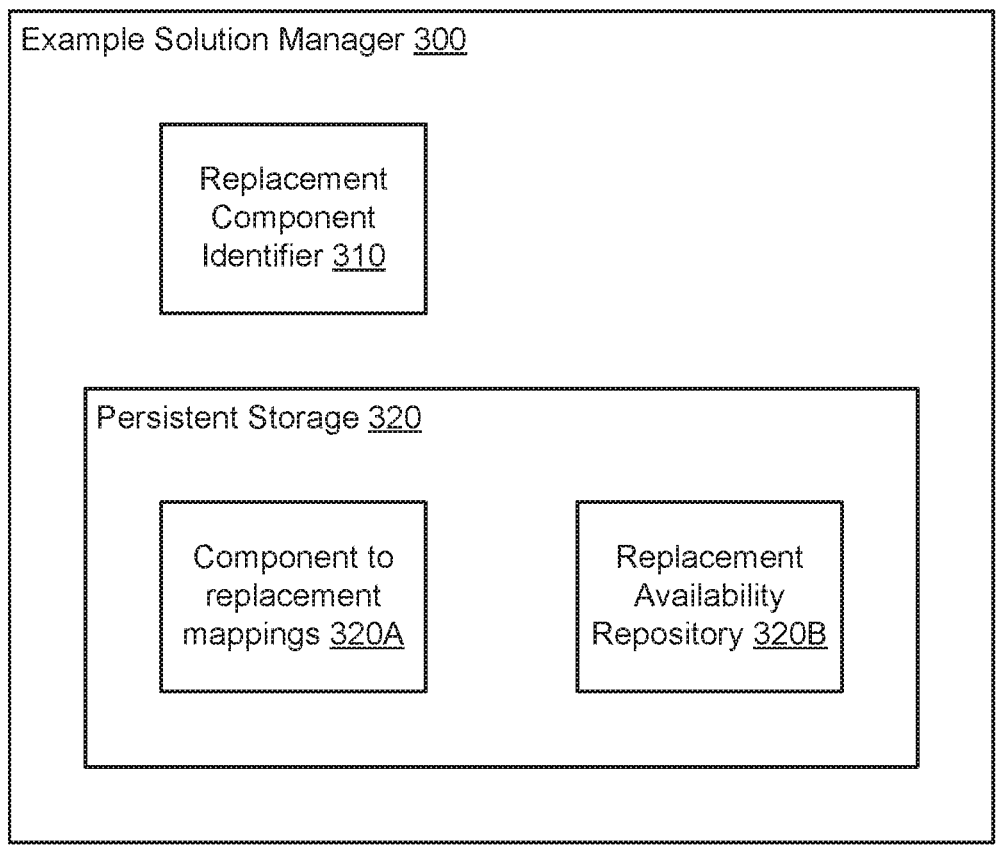
FIG. 3 shows a diagram of an example solution manager in accordance with one or more embodiments of the invention.

As discussed above, the example support manager (200) may interact with a solution manager when attempting to initiate the performance of a solution level corrective action. FIG. 3 shows a diagram of an example solution manager (300) in accordance with one or more embodiments of the invention. The example solution manager (300) may identify replacement components for computing clusters. In other words, the solution manager may identify whether a replacement component both exists and is available, i.e., in stock or otherwise obtainable. To provide the aforementioned functionality, the example solution manager may include a replacement component identifier (310) that identifies replacement components in response to request for replacements and a persistent storage that stores data structures used by the replacement component identifier (310) to identify replacement components. Each component of the example solution manager is discussed below.

In one or more embodiments of the invention, the replacement component identifier (310) obtains requests from the support manager to identify a replacement component for a component. In response to obtaining a request, the replacement component identifier (310) may use the data structures stored in the persistent storage (320) to identify a replacement component. The data structure may enable a replacement component that both exists and is available to be identifier. The replacement component identifier (310) may notify the support manager of the identifier replacement component in response to the request. To provide the aforementioned functionality, the replacement component identifier (310) may perform all or a portion of the method illustrated in FIG. 7.

In one or more embodiments of the invention, the replacement component identifier (310) is a hardware device including circuitry. The replacement component identifier (310) may be, for example, digital signal processor, a field programmable gate array, or an application specific integrated circuit. The replacement component identifier (310) may be other types of hardware devices without departing from the invention.

In one or more embodiments of the invention, the replacement component identifier (310) is implemented as computing code stored on a persistent storage that when executed by a processor performs the functionality of the replacement component identifier (310). The processor may be hardware processor including circuitry such as, for example, a central processing unit or a microcontroller. The processor may be other types of hardware devices for processing digital information without departing from the invention.

In one or more embodiments of the invention, the persistent storage (320) is a storage device that stores data structures. The persistent storage (320) may be a physical or virtual device. For example, the persistent storage (320) may include solid state drives, solid state drives, tape drives, and other components to provide data storage functionality. Alternatively, the persistent storage (320) may be a virtual device that utilizes the physical computing resources of other components to provide data storage functionality.

In one or more embodiments of the invention, the persistent storage (320) stores component to replacement mappings (320A) and a replacement availability repository (320B). The persistent storage (320) may store additional data structures without departing from the invention.

The component to replacement mappings (320A) may be data structures that maps components to replacement components. Over time, a particular component may not longer be produced and, consequently, become unavailable. The component to replacement mappings (320A) may specify mappings between a component and all other types of components that are suitable replacements.

The replacement availability repository (320B) may specify the availability for each replacement component specified by the component to replacement mappings (320A). Thus, the component to replacement mappings (320A) may be used to identify all possible replacement components for a given component and the replacement availability repository (320B) may specify the availability for each of the possible replacement components. In this manner, the aforementioned data structures may specify the availability for each possible replacement component.

While the data structures of the persistent storage (320) are illustrated as separate data structures, the aforementioned data structures may be combined with each other and/or other data without departing from the invention. Additionally, while the aforementioned data structures are illustrated as being stored on the example solution manager (300), the data structures may be stored on persistent storage of other devices without departing from the invention.

Figure 4:
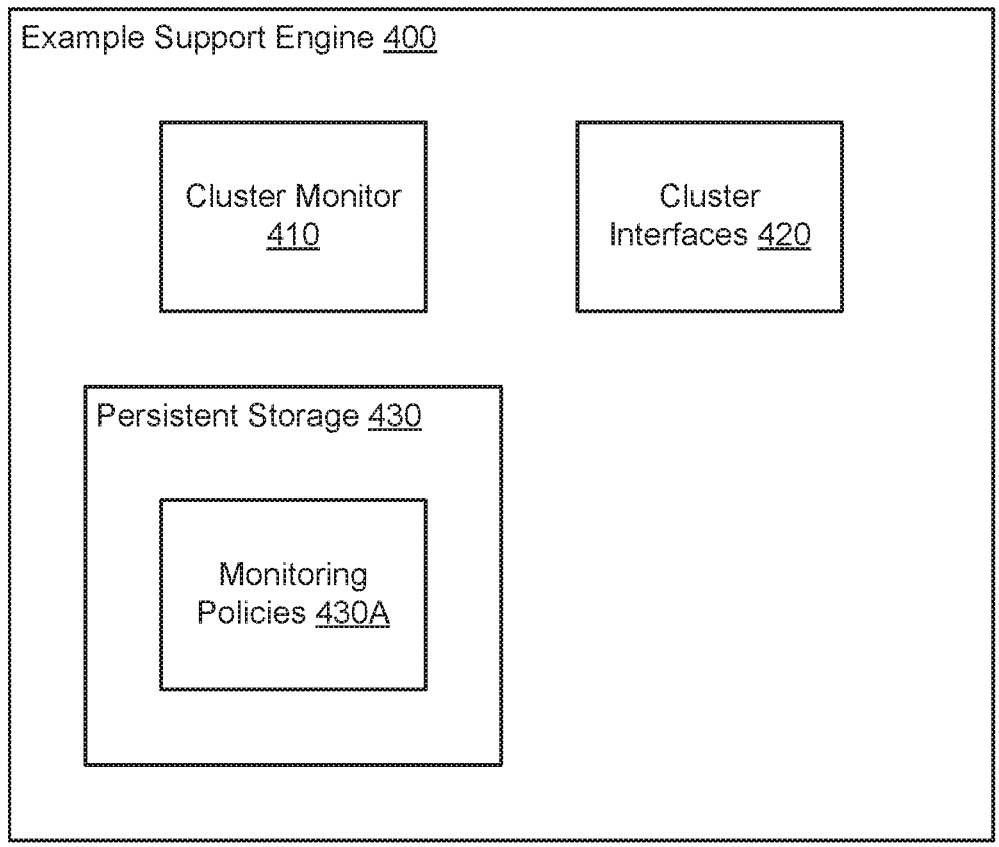
FIG. 4 shows a diagram of an example support engine in accordance with one or more embodiments of the invention.

As discussed above, the example support manager (200) may interact with a support engine supporting computing clusters. FIG. 4 shows a diagram of an example support engine (400) in accordance with one or more embodiments of the invention. The example support engine (400) may: (i) monitor computing clusters, (ii) identify potential component failures, (iii) notify a support manager of the potential component failures to start support sessions, (iv) collect solution level state information, (v) generate a support package including the solution level state information, and (vi) send the generated support package to the support manager to initiate the support session. Once a support session is initiated, the example support engine (400) may perform solution level corrective actions to address the potential component failures. The solution level corrective actions may be specified by the support manager.

To provide the aforementioned functionality, the example support engine (400) may include a cluster monitor (410) that performs both component level and solution level monitoring of computing clusters via cluster interfaces (420). The example support engine (400) may also include a persistent storage (430) that stores data structures used by the cluster monitor (410) when monitoring the computing clusters. Each component of the example support engine is discussed below.

In one or more embodiments of the invention, the cluster monitor (410) monitors the computing clusters based on monitoring policies (430A) stored in the persistent storage (430). The cluster monitor (410) may monitor the operations of the computing clusters. The monitoring may be performed by, for example, periodically obtaining performance statistics of the respective components of the computing clusters. The performance statistics may be, for example, the compression ratio of data stored in the computing clusters, the transaction rate of applications executing on the clusters, the bandwidth between computing devices of the computing clusters, etc. Other performance statistics may be used without departing from the invention. When the monitoring indicates that a component has potentially failed, the cluster monitor may initiate a support session with a support manager, perform solution level monitoring to obtain solution level state information, and perform solution level corrective actions. To provide the aforementioned functionality, the cluster monitor (410) may perform all or a portion of the method illustrated in FIG. 6.

In one or more embodiments of the invention, the cluster monitor (410) is a hardware device including circuitry. The cluster monitor (410) may be, for example, digital signal processor, a field programmable gate array, or an application specific integrated circuit. The cluster monitor (410) may be other types of hardware devices without departing from the invention.

In one or more embodiments of the invention, the cluster monitor (410) is implemented as computing code stored on a persistent storage that when executed by a processor performs the functionality of the cluster monitor (410). The processor may be hardware processor including circuitry such as, for example, a central processing unit or a microcontroller. The processor may be other types of hardware devices for processing digital information without departing from the invention.

The cluster interfaces (420) may be operable connections between the example support engine and one or more computing clusters. The operable connections may be supported by any combination of wired and/or wireless networking. In a scenario in which the example support engine (400) only supports a single computing cluster, only a single cluster interface may be present. The example support engine (400) may include any number of cluster interfaces without departing from the invention.

In one or more embodiments of the invention, the persistent storage (430) is a storage device that stores data structures. The persistent storage (430) may be a physical or virtual device. For example, the persistent storage (430) may include solid state drives, solid state drives, tape drives, and other components to provide data storage functionality. Alternatively, the persistent storage (430) may be a virtual device that utilizes the physical computing resources of other components to provide data storage functionality.

In one or more embodiments of the invention, the persistent storage (430) stores monitoring policies (430A). The persistent storage (430) may store additional data structures without departing from the invention.

The monitoring policies (430A) may be data structures that specify how the monitoring is to be performed and actions that are to be taken in response to the occurrence of a predetermined event identified by the monitoring. For example, the monitoring policies (430A) may specify that the monitoring is to be performed by monitoring a transaction rate of a database executing on a cluster and if the transaction rate falls below a predetermined threshold a solid state disk storing a cache used by the database is to be identified as having potentially failed. For additional details regarding monitoring policies (430A), See FIGS. 5A and 5B.

While the data structure of the persistent storage (430) is illustrated as a solitary data structure, the aforementioned data structure may be combined with other data without departing from the invention. Additionally, while the aforementioned data structure is illustrated as being stored on the example support engine (400), the data structure may be stored on persistent storage of other devices without departing from the invention.

Figure 5A:
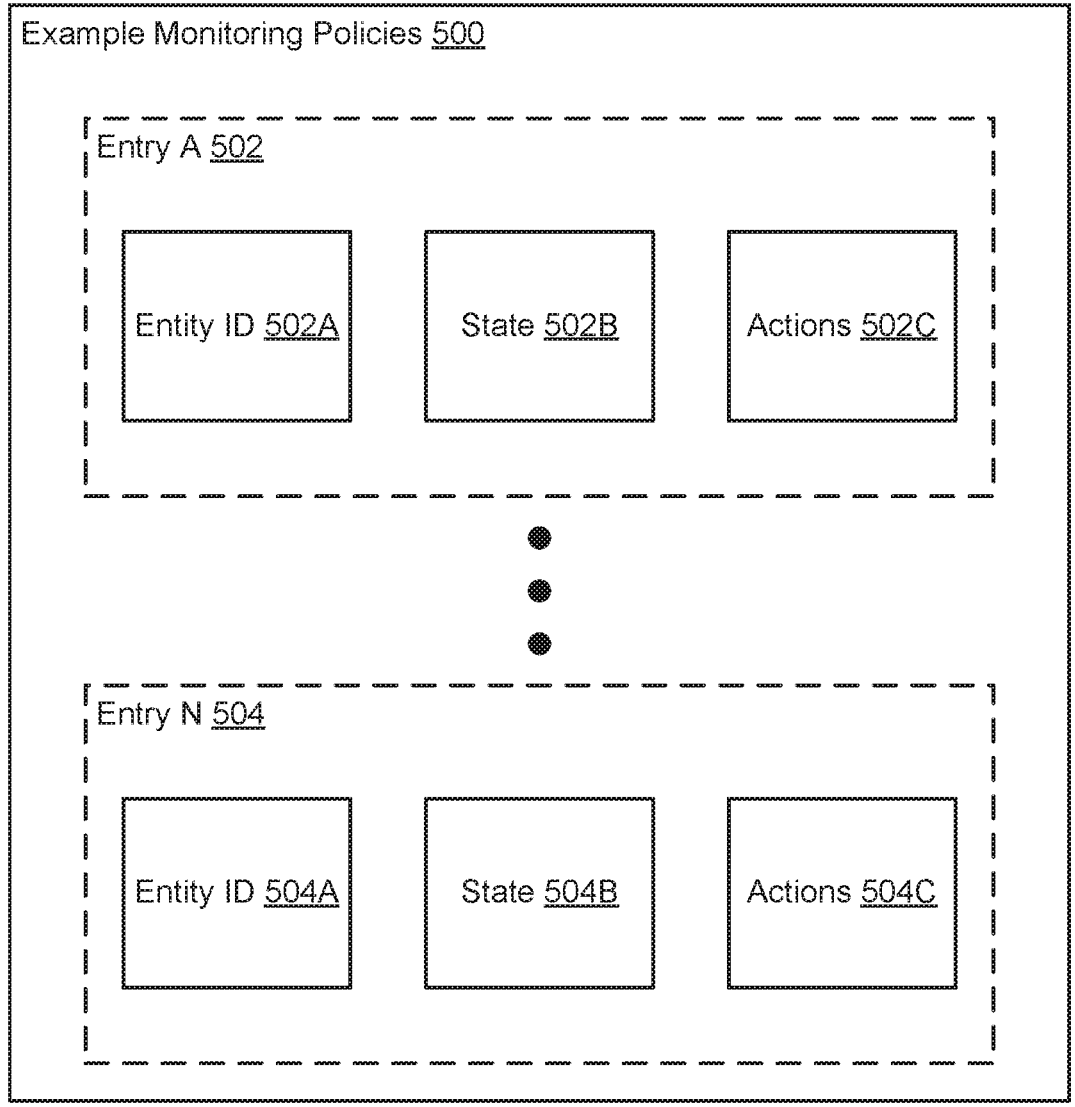
FIG. 5A shows a diagram of example monitoring policies in accordance with one or more embodiments of the invention.

FIG. 5A shows a diagram of example monitoring policies (500) in accordance with one or more embodiments of the invention. The example monitoring policies (500) may specify monitoring to be performed by a support engine and actions to be taken when predetermined condition occurs that is identified based on the monitoring. The example monitoring policies (500) may specify the policies at any level of granularity without departing from the invention.

In one or more embodiments of the invention, the example monitoring policies (500) include a number of entries (502, 504). Each of the entries may specify a monitoring policy. Each entry may include an entity identifier (502A, 504A), a state (502B, 504B), and actions (502C, 504C).

The entity identifier (502A, 504A) may be an identifier of entity to be monitored. The entity identifier (502A, 504A) may identify a component, a computing device, a computing cluster, or a solution, i.e., group of computing devices or group of computing clusters.

The state (502B, 504B) may specify a condition of the component identifier by the entity identifier (502A, 504A) that, when met, triggers the performance of the actions (502C, 504C) of the respective entry. The state (502B, 504B) may be a condition such as, for example, a threshold or a range. The state (502B, 504B) may be other types of conditions without departing from the invention. When the monitoring indicates that the monitored entity meets the condition specified by the state (502B, 504B), the policy associated with entry may invoke the performance of the actions associated with the respective policy.

The actions (502C, 504C) may be actions to be performed by the support engine in response to the conditions specified by the state being met. The actions may be, for example, the performance of solution level monitoring, obtaining of predetermined information from a computing cluster, modifying the operation of a computing cluster, or any other type of action. For additional details regarding the actions (502C, 504C), See FIG. 5B.

While the example monitoring policies (500) are illustrated as a list of entries, the information of the example monitoring policies (500) may be stored in other formats, may include additional, less, and/or different information, and/or may be broken down into multiple data structures without departing from the invention.

FIG. 5B shows a diagram of example actions (520) in accordance with one or more embodiments of the invention. The example actions (520) may specify one or more actions to be performed.

In one or more embodiments of the invention, the example actions (520) include obtaining of a hardware state of a component host (522), obtaining of a software state of the component host (522), obtaining of host settings (524), validation of the component (526), initiation of a new support session (528), and generation of a log (530). The component host may be the computing device that hosts the component that was identified as potentially failed. The validation may be to compare the functionality of the component to a baseline, e.g., performance test the component. The generated log may include all of the actions performed by a support engine and the response from a computing cluster.

While the example actions (520) are shown as included a limited number and selection of actions that may be performed, the example actions (520) may include any quantity and type of actions without departing from the invention.

In some embodiments of the invention, the example actions (520) may include a triggering of another policy. For example, the example actions (520) may cause a condition specified by a state of another action to be met and, thus, trigger the performance of another set of actions. In this manner, monitoring policies may be nested and/or recursively trigger any number of monitoring policies upon the triggering of any one monitoring policy.

As discussed above, the system of FIG. 1 perform the methods of FIGS. 6-8.

FIG. 6 shows a flowchart of a method in accordance with one or more embodiments of the invention. The method depicted in FIG. 6 may be used to manage a computing cluster in accordance with one or more embodiments of the invention. The method shown in FIG. 6 may be performed by, for example, an support engine (120, FIG. 1). Other component of the system illustrated in FIG. 1 may perform the method of FIG. 6 without departing from the invention.

In Step 600, computing clusters are monitored using monitoring policies.

In one or more embodiments of the invention, the monitoring may be accomplished by obtaining state information from the computing clusters and comparing the state information to the state policies. The monitoring may be performed, periodically, in accordance with a schedule, or via other regimes. The monitoring may obtain component level state information from components of computing devices of the computing clusters. The component level state information may be, for example, performance characteristics of the components such as, for example, a processing rate, bandwidth, or storage rate. The performance characteristics may be other types of characteristics without departing from the invention.

In Step 602, a potential component failure is identified based on the monitoring.

In one or more embodiments of the invention, the potential component failure is identified by comparing the obtain component level state information to monitoring policies. If the component level state information exceeds a threshold specified by the monitoring policies, the component associated with the component level state information may be identified as a potential component failure.

In Step 604, an error state of the computing cluster is identified in response to the identified potential component failure.

In one or more embodiments of the invention, the error state of the computing cluster is identified based on the potential component failure. For example, each type of component failure may be associated with an error state of the computing cluster. In contrast to traditional approaches that may focus on component level failures, embodiments of the invention may use the presence of a potential component failure as an indicated of a cluster level error state.

In Step 606, solution level state information is obtained from the computing cluster based on the identified error state of the cluster.

In one or more embodiments of the invention, the solution level state information is obtained by characterizing the performance of each component of each computing device of a cluster associated with the cluster level error state. Thus, embodiments of the invention may automatically obtain solution level state information in response to the identification of a potential component level failure.

In Step 608, a support package is generated that includes the solution level state information.

The support package may include an identifier of the solution, an identifier of the computing cluster, identifiers of the computing devices of the computing cluster, identifiers of the components of the computing devices, the potential component failure, an identifier of the potentially failed component, and/or other information regarding the solution.

In Step 610, a support session is initiated by sending the generated support package to a support manager.

In Step 612, a solution level corrective action is obtained. The solution level corrective action may be obtained from the support manager or another entity.

In Step 614, the solution level corrective action is performed.

In one or more embodiments of the invention, the solution level corrective action is replacing the component with a replacement component selected based on the solution level state information.

In one or more embodiments of the invention, the replacement component may be identified by identifying a solution type of the computing cluster, e.g., data storage, processing, etc. A certified component, e.g., a component that is known to be compatible with the solution type, may be selected. The selected certified component may be used as the replacement component.

In one or more embodiments of the invention, the solution level corrective action is modifying firmware associated with the potentially failed component. The modification may be a replacement of the firmware or a modification of the settings of the firmware. The modification may be obtained from a support manager.

In one or more embodiments of the invention, the solution level corrective action is modifying the firmware of a second component that is not the potentially failed component. The second component and the potentially failed component may be hosted by the same computing device.

In one or more embodiments of the invention, the solution level corrective action is modifying the firmware of a component of a computing device that does not host the potentially failed component.

The method may end following Step 614.

FIG. 7 shows a flowchart of a method in accordance with one or more embodiments of the invention. The method depicted in FIG. 7 may be used to manage a computing cluster in accordance with one or more embodiments of the invention. The method shown in FIG. 7 may be performed by, for example, a support manager (100, FIG. 1). Other component of the system illustrated in FIG. 1 may perform the method of FIG. 7 without departing from the invention.

In Step 700, a support package associated with a support session is obtained.

In one or more embodiments of the invention, the support package includes solution level state information.

In Step 702, the support package is analyzed using a knowledge base to identify a corrective action.

In one or more embodiments of the invention, the support package is analyzed by matching the solution level state information to similar information in the knowledge base. A corrective action associated with the matched solution level state information may be identified.

In one or more embodiments of the invention, the corrective action is replacement of the potentially failed component with a replacement component. The replacement component may be selected by a solution manager.

In one or more embodiments of the invention, the corrective action is a replacement of an application or firmware. The replacement may change a version of the application or firmware. The replacement may be reinstallation of an already installed version.

In one or more embodiments of the invention, the corrective action is a changing of setting of an application or firmware.

In Step 704, the corrective action is sent to a support engine associated with the support session.

In Step 706, an outcome associated with the corrective action is obtained from the support engine.

In Step 708, the knowledge base is updated based on the outcome.

In one or more embodiments of the invention, the knowledge base is updated by storing an associated between the solution state information and the outcome in the knowledge base.

The method may end following Step 708.

FIG. 8 shows a flowchart of a method in accordance with one or more embodiments of the invention. The method depicted in FIG. 8 may be used to select a replacement component in accordance with one or more embodiments of the invention. The method shown in FIG. 8 may be performed by, for example, a solution manager (110, FIG. 1). Other component of the system illustrated in FIG. 1 may perform the method of FIG. 8 without departing from the invention.

In Step 800, a replacement hardware identification request is obtained.

In one or more embodiments of the invention, the request is obtained from a support manager. The request may include an identifier of a potentially failed component.

In Step 802, replacement hardware associated with a component specified by the request of Step 800 is selected.

In one or more embodiments of the invention, the selected replacement hardware is any hardware that is certified to work with the solution which hosts the potentially failed component.

In Step 804, it is determined whether the selected replacement hardware is available. If the replacement hardware is available, the method proceeds to Step 806. If the selected replacement hardware is not available, the method proceeds to Step 808.

In Step 806, the selected replacement hardware is sent.

In Step 808, an alternative replacement hardware that is both certified and available is sent.

The method may end follow Step 806 or Step 808.

To further clarify embodiments of the invention, a non-limiting example is provided below.

Example 1

Figure 9A:
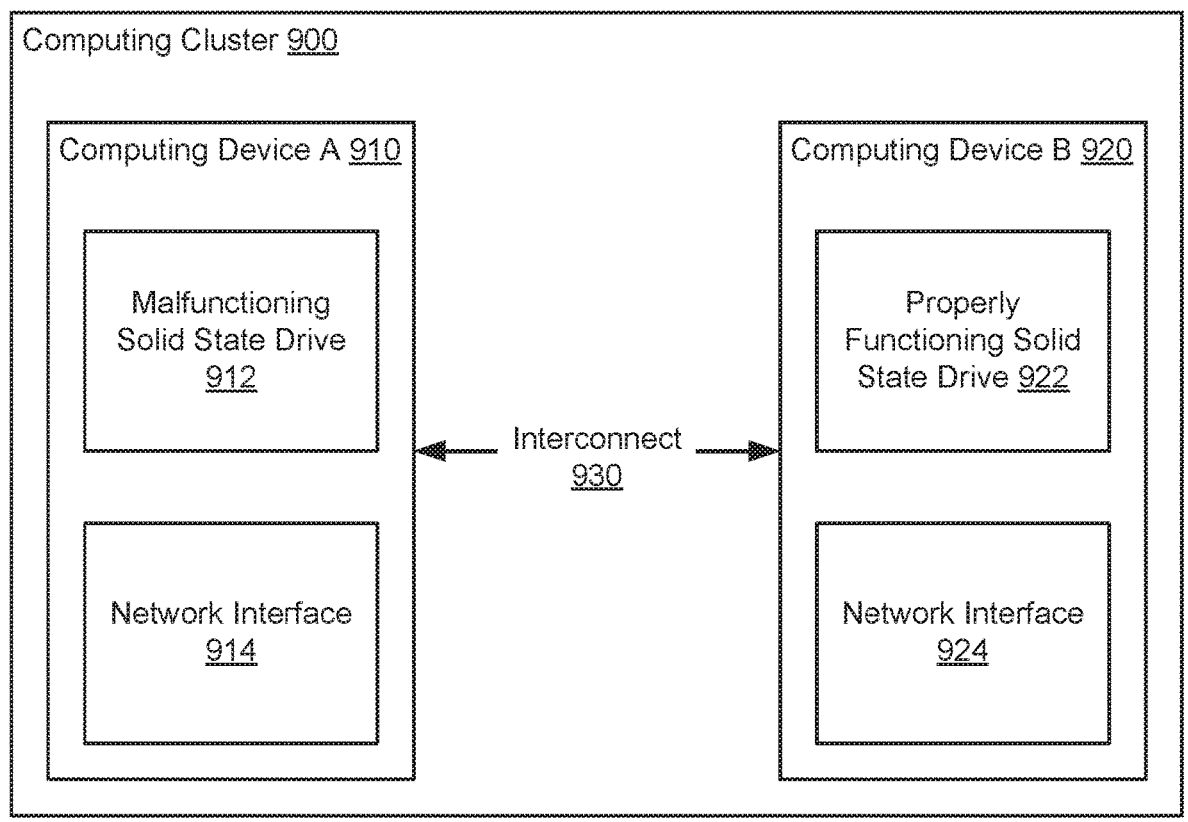
FIG. 9A shows a diagram of a malfunctioning computing cluster.

Consider a deployment scenario as illustrated in FIG. 9A which shows a diagram of a system including a computing cluster (900) that includes two computing devices (910,

920). At a point in time, a malfunctioning solid state drive (912) may start to impact the performance of the computing cluster (900) that manifests in a deterioration of the performance of an interconnect (930).

Based on its monitoring of the computing cluster (900), a support engine (not shown) may identify that the interconnect (930) is potentially failing due to its reduced performance. In response to the identified potential component failure, the support engine may obtain solution level state information. The solution level state information may include the iops of the malfunctioning solid state drive (912).

The solution level state information may be analyzed based on information in a knowledge base (not shown). The analysis shows that the malfunctioning solid state drive (912) is malfunctioning. Based on the analysis, it is determined that the malfunctioning solid state drive (912) should be replaced.

Figure 9B:
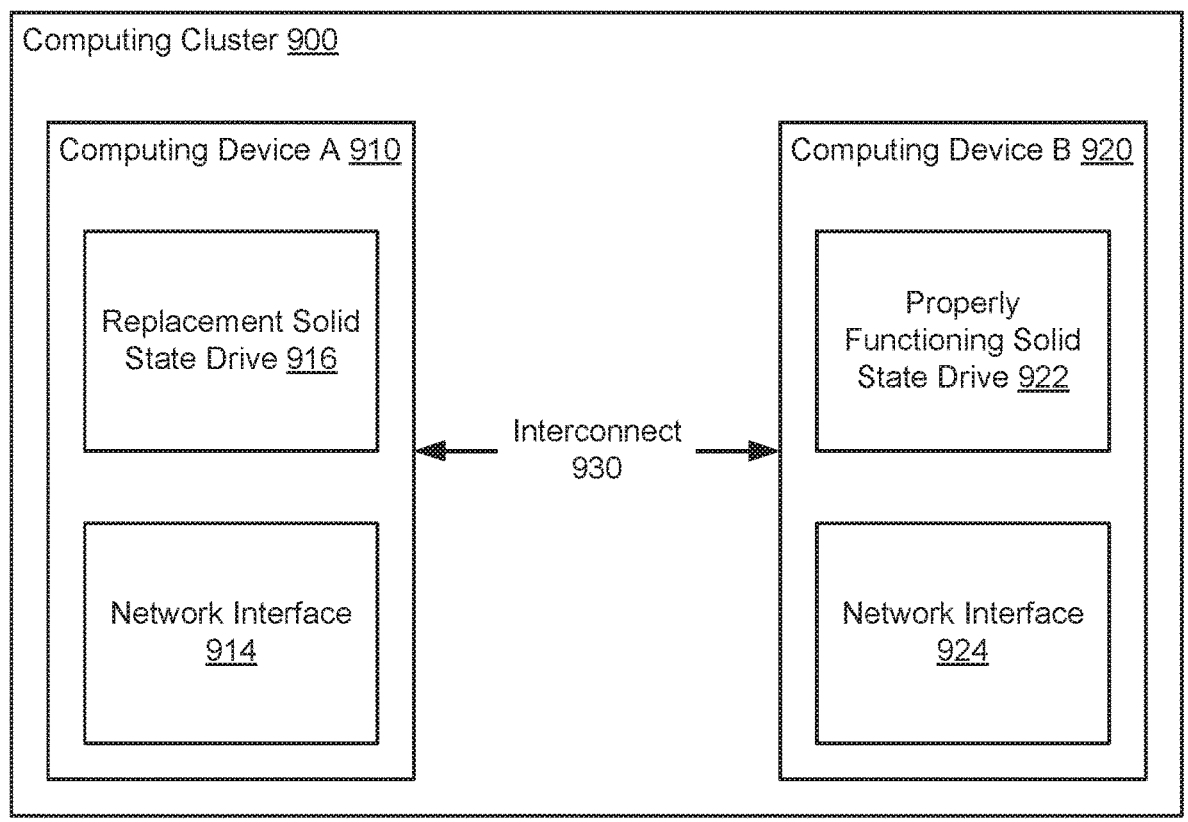
FIG. 9B shows a diagram of the computing cluster of FIG. 9A after corrective actions have been performed.

FIG. 9B shows a diagram of the system of FIG. 9A after the malfunctioning solid state drive is replaced with a replacement solid state drive (916). As seen from FIG. 9B, since the malfunctioning solid state drive, rather than component that facilitated the interconnect (930) such as the network interface cards (914, 924), the performance of the system was restored without replacing component that were operating properly.

End of Example 1

Figure 10:
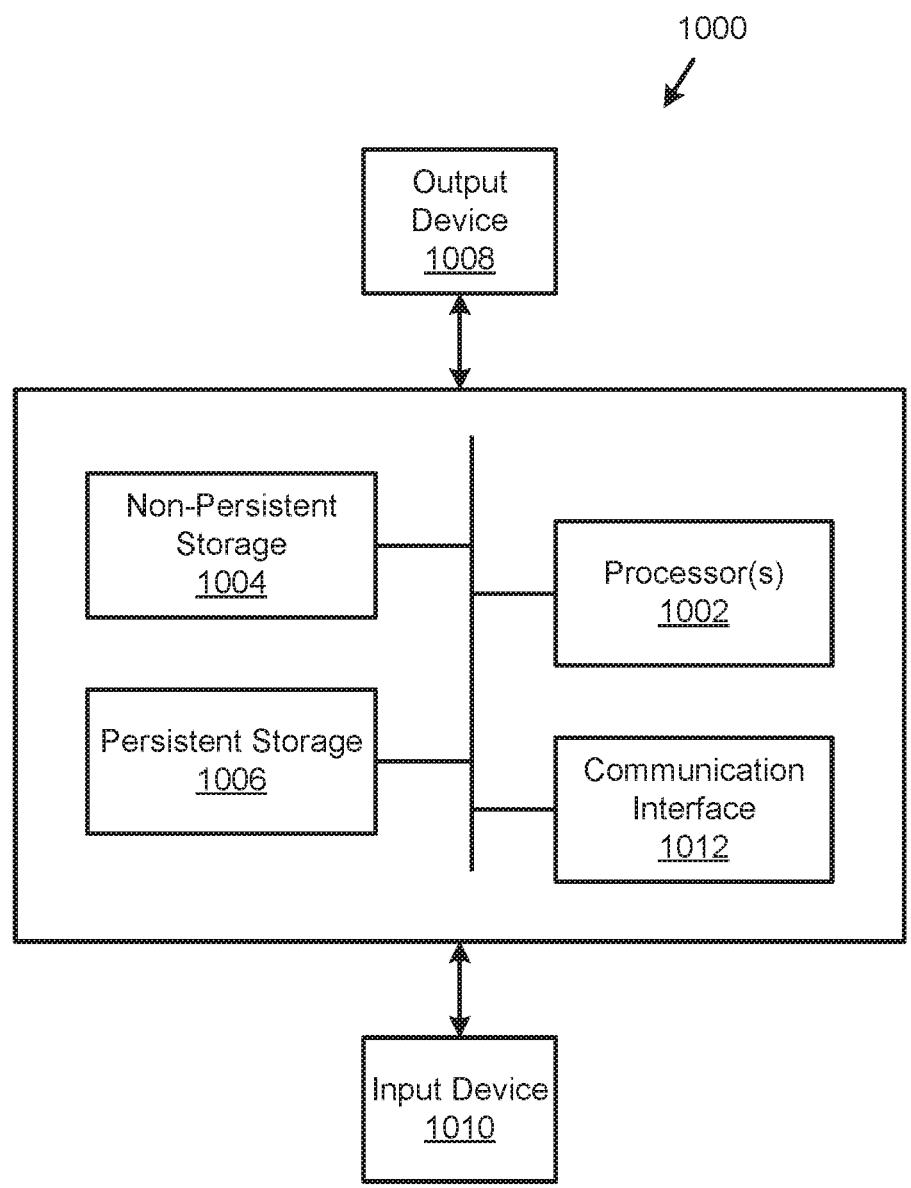
FIG. 10 shows a diagram of a computing device in accordance with one or more embodiments of the invention.

As discussed above, embodiments of the invention may be implemented using computing devices. FIG. 10 shows a diagram of a computing (1000). The computing device (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), input devices (1010), output devices (1008), and numerous other elements (not shown) and functionalities. Each of these components is described below.

In one embodiment of the invention, the computer processor(s) (1002) may be an integrated circuit for processing instructions. For example, the computer processor(s) may be one or more cores or micro-cores of a processor. The computing device (1000) may also include one or more input devices (1010), such as a touchscreen, keyboard, mouse, microphone, touchpad, electronic pen, or any other type of input device. Further, the communication interface (1012) may include an integrated circuit for connecting the computing device (1000) to a network (not shown) (e.g., a local area network (LAN), a wide area network (WAN) such as the Internet, mobile network, or any other type of network) and/or to another device, such as another computing device.

In one embodiment of the invention, the computing device (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing devices exist, and the aforementioned input and output device(s) may take other forms.

Embodiments of the invention may improve the performance of solutions that utilize distributed computations performed by computing clusters or other groups of computing devices. Embodiments may improve the performance of the solutions by improving the uptime of the solutions. Specifically, embodiments of the invention may provide a method of determining corrective actions based on solution level state information rather than state information of a component that is potentially failing. Doing so reduces the number of corrective actions that may need to be performed to repair the solution when a portion of the solution fails. For example, a failure of a component may manifest itself throughout a solution in unexpected ways and impact the performance of other components. Traditional approaches to repair solutions focus on relating decreases in the performance of individual components to corrective actions. Consequently, the traditional approach may needlessly cause applications or hardware to be replaced that is not, in fact, the cause of the decreased performance of the system. Embodiments of the invention may prevent this problem by performing corrective actions that are based on solution level state information rather than component level state information. In this manner, a solution that is impacted by a malfunctioning or otherwise failed component may be corrected without needlessly replacing components, application, or firmware. Thus, embodiments of the invention may improve an uptime of a solution and decrease a cost of supporting a solution.

Accordingly, one or more embodiments of the invention address the problem of detecting and correcting component failure in a distributed system. Since the failure of a component in a distributed system may cause unpredictable performance penalties, embodiments of the invention necessarily address problems that are rooted in computing technology. That is the identification of component failure and remediation of failed components in a distributed environment that might otherwise mask the true cause of a performance decrease of a distributed system.

While embodiments of the invention have been described as addressing one or more problems, embodiments of the invention are applicable to address other problems and the scope of the invention should not be limited to addressing the problems specifically discussed throughout this application.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A support engine for managing computing clusters, comprising:
a persistent storage comprising monitoring policies; and
a processor programmed to:
monitor a computing cluster of the computing clusters;
identify a potential component failure of a component of the computing cluster based on the monitoring and the monitoring policies;
in response to identifying the potential component failure:
identify an error state of the computing cluster;
obtain solution level state information from the computing cluster based on the identified error state;
generate a support package comprising the solution level state information;
initiate a support session by sending the generated support package to a support manager;
after initiating the support session:
obtain a solution level corrective action comprising:
replacing the component with a second component selected based on the solution level state information, the replacing of the component comprising:
identifying a solution type of the computing cluster,
selecting a certified component associated with the solution type, and
using the certified component as the second component, and
perform the solution level corrective action.

2. The support engine of claim 1, wherein the solution level state information comprises:
a hardware state of a computing device hosting the component.

3. The support engine of claim 1, wherein the solution level state information comprises:
a software state of a computing device hosting the component.

4. The support engine of claim 1, wherein the solution level state information comprises:
a transaction log of a computing device hosting the component.

5. The support engine of claim 1, wherein monitor the computing cluster of the computing clusters comprises:
obtaining component level state information from a plurality of components of the computing cluster; and
performing a comparison of the component level state information to the monitoring policies to obtain component-policy comparisons;
identifying any of the monitoring policies invoked by the component level state information based on the comparison.

6. The support engine of claim 5, wherein the monitoring policies comprise:
a plurality of thresholds associated with the component level state information; and
actions associated with each of the plurality of thresholds.

7. The support engine of claim 5, where identifying the potential component failure of the computing cluster based on the monitoring and the monitoring policies comprises:
making a determination that a threshold specified by the monitoring policies has been exceeded based on the component-policy comparisons; and
identifying a component of the components having the component level state information that exceeded the threshold.

8. The support engine of claim 1, wherein the support package further comprises:
an identifier of the component;
an identifier of the computing cluster;
a solution type of the computing cluster.

9. The support engine of claim 1, wherein the support package further comprises:
a transaction log of a computing device that does not host the component.

10. The support engine of claim 9, wherein computing device is part of the computing cluster.

11. The support engine of claim 1, wherein the support package further comprises:
a listing of network address identifiers of each computing device of the computing cluster.

12. A method for managing computing clusters, comprising:
monitoring a computing cluster of the computing clusters;
identifying a potential component failure of a component of the computing cluster based on the monitoring and monitoring policies;
in response to identifying the potential component failure:
identifying an error state of the of the computing cluster;
obtaining solution level state information from the computing cluster based on the identified error state;
generating a support package comprising the solution level state information;
initiating a support session by sending the generated support package to a support manager to correct the potential component failure;
after initiating the support session:
obtain a solution level corrective action comprising:
replacing the component with a second component selected based on the solution level state information, the replacing of the component comprising:
identifying a solution type of the computing cluster,
selecting a certified component associated with the solution type, and
using the certified component as the second component, and
performing the solution level corrective action.

13. The method of claim 12, wherein the solution level state information comprises:
a hardware state of a computing device hosting the component.

14. The method of claim 12, wherein monitoring the computing cluster of the computing clusters comprises:
obtaining component level state information from a plurality of components of the computing cluster; and performing a comparison of the component level state information to the monitoring policies to obtain component-policy comparisons;

identifying any of the monitoring policies.

15. The method of claim 14, wherein the monitoring policies comprise:

a plurality of thresholds associated with the component level state information; and actions associated with each of the plurality of thresholds.

16. The method of claim 14, where identifying the potential component failure of the computing cluster based on the monitoring and the monitoring policies comprises:

making a determination that a threshold specified by the monitoring policies has been exceeded based on the component-policy comparisons; and identifying a component of the components having the component level state information that exceeded the threshold.

17. A non-transitory computer readable medium comprising computer readable program code, which when executed by a computer processor enables the computer processor to perform a method for managing computing clusters, the method comprising:

monitoring a computing cluster of the computing clusters;

identifying a potential component failure of a component of the computing cluster based on the monitoring and monitoring policies;

in response to identifying the potential component failure:

identifying an error state of the of the computing cluster;

obtaining solution level state information from the computing cluster based on the identified error state;

generating a support package comprising the solution level state information;

initiating a support session by sending the generated support package to a support manager to correct the potential component failure;

after initiating the support session:

obtaining a solution level corrective action comprising:

replacing the component with a second component selected based on the solution level state information, the replacing of the component comprising:

identifying a solution type of the computing cluster, selecting a certified component associated with the solution type, and using the certified component as the second component, and performing the solution level corrective action.

18. The non-transitory computer readable medium of claim 17, wherein monitoring the computing cluster of the computing clusters comprises:

obtaining component level state information from a plurality of components of the computing cluster; and performing a comparison of the component level state information to the monitoring policies to obtain component-policy comparisons;

identifying any of the monitoring policies.

19. The non-transitory computer readable medium of claim 18, wherein the monitoring policies comprise:

a plurality of thresholds associated with the component level state information; and actions associated with each of the plurality of thresholds.

20. The non-transitory computer readable medium of claim 18, where identifying the potential component failure of the computing cluster based on the monitoring and the monitoring policies comprises:

making a determination that a threshold specified by the monitoring policies has been exceeded based on the component-policy comparisons; and identifying a component of the components having the component level state information that exceeded the threshold.

* * * * *